(12) United States Patent
Shaffer et al.

(10) Patent No.: US 9,460,457 B1
(45) Date of Patent: Oct. 4, 2016

(54) AUTOMATICALLY ANNOTATING CONTENT ITEMS WITH AN ENTITY

(71) Applicant: Google Inc., Mountain View, CA (US)

(72) Inventors: Dan Shaffer, Palo Alto, CA (US); Chuan Jiang, Sunnyvale, CA (US); Dani Suleman, Fremont, CA (US); Lakshmi Kumar Dabbiru, Sunnyvale, CA (US); Varouj Chitilian, Hillsborough, CA (US); Shreyas Doshi, Mountain View, CA (US)

(73) Assignee: Google Inc., Mountain View, CA (US)

( * ) Notice: Subject to any disclaimer, the term of this patent is extended or adjusted under 35 U.S.C. 154(b) by 329 days.

(21) Appl. No.: 13/830,561

(22) Filed: Mar. 14, 2013

(51) Int. Cl.
  *G06F 17/00* (2006.01)
  *G06F 17/21* (2006.01)
  *G06Q 30/02* (2012.01)
  *G06F 17/30* (2006.01)

(52) U.S. Cl.
  CPC ..... *G06Q 30/0276* (2013.01); *G06F 17/30554* (2013.01); *G06F 17/30864* (2013.01)

(58) Field of Classification Search
  CPC .......... G06F 17/30867; G06F 17/30873; G06F 17/30905; G06F 17/30761; G06F 17/30657; G06F 17/30864; G06F 17/30554; G06F 17/30979; G06Q 30/0251; G06Q 30/0273; G06Q 30/0241; G06Q 30/0277; G06Q 30/0271; G06Q 30/0276
  See application file for complete search history.

(56) References Cited

U.S. PATENT DOCUMENTS

| 7,593,965 | B2 | 9/2009 | Gabriel |
| 7,627,556 | B2 | 12/2009 | Liu et al. |
| 8,671,022 | B2* | 3/2014 | Sinn et al. ................. 705/14.66 |
| 2007/0192168 | A1* | 8/2007 | Van Luchene .... G06F 17/30646 705/14.54 |
| 2009/0193032 | A1 | 7/2009 | Pyper |
| 2010/0100442 | A1* | 4/2010 | Gorsline et al. ........... 705/14.53 |
| 2010/0145762 | A1* | 6/2010 | Coladonato et al. ........... 705/10 |
| 2011/0040690 | A1* | 2/2011 | Araiza-Boys .......... G06Q 30/02 715/764 |
| 2012/0166290 | A1 | 6/2012 | Reis et al. |
| 2013/0326354 | A1* | 12/2013 | Anderson ..................... 715/733 |

* cited by examiner

*Primary Examiner* — Ariel Mercado
(74) *Attorney, Agent, or Firm* — Foley & Lardner LLP; John D. Lanza; James De Vellis (57) ABSTRACT

Methods and systems for providing content for display including receiving a first content item, receiving a second content item, automatically annotating the first content item and the second content item with an entity, comparing the entity annotation of the first content item and the entity annotation of the second content item, and, based on the comparison, displaying the annotated first content item with the second content item to a user.

19 Claims, 5 Drawing Sheets

AUTOMATICALLY ANNOTATING CONTENT ITEMS WITH AN ENTITY

BACKGROUND

The present disclosure relates generally to systems and methods for providing content for display and, in particularly, for automatically annotating a first content item to a second content item and, displaying the annotated first content item with the second content item to a user.

SUMMARY

In one implementation, in general, a computer-implemented method for providing content for display is disclosed. The method includes receiving, at a server, a first content item. The method also includes receiving, at the server, a second content item. The method further includes automatically annotating the first content item and the second content item with an entity. The method also includes comparison the entity annotation of the first content item and the entity annotation of the second content item. The method further includes, based on the comparison, displaying the annotated first content item with the second content item to a user.

In another implementation, in general, a system for matching a plurality of visits to a website with a plurality of content selection parameters is disclosed. The system includes a processing circuit. The processing circuit is operable to receive a first content item. The processing circuit is also operable to receive a second content item. The processing circuit is further operable to automatically annotate the first content item and the second content item with an entity. The processing circuit is operable to compare the entity annotation of the first content item to the entity annotation of the second item. The processing circuit is also operable to, based on the comparison, display the annotated first content item with the second content item to a user.

In yet another implementation, in general, a computer-readable storage medium having instructions therein, the instructions being executable by a processor to cause the processor to perform operations is disclosed. The operations include receiving a first content item. The operations also include receiving a second content item. The operations further include automatically annotating the first content item and the second content item with an entity. The operations also include comparing the entity annotation of the first content item and the entity annotation of the second content item. The operations further include displaying the annotated first content item with the second content item to a user.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Content items served to a user, such as advertisements, may be more effective if additional content items, such as video content, are served along with the advertisement. The content provider may want to link the content item with a video to serve to the user to provide a better experience for the user. For example, an advertisement for a Company B's Mp3 player may also include a related video from Company B's channel, showing the benefits of owning their particular Mp3 player. Another example includes annotating an advertisement with social network information, such as "Camera A is the most popular camera on this social network." A trending topic from a social network could also be matched with an advertisement to provide another example of an automatically generated annotation, such as "578 people are talking about Camera A on this social network."

Providing a second content item, such as the video or the social network annotation, that helps the user discover, learn, share, decide, etc. relating to the product being advertised by the first content item may increase performance characteristics, such as conversions. However, it may be challenging and difficult for a content provider to manually link their content items with other content items.

The present disclosure describes an automatic method and system for matching a second content item (e.g., video) with a first content item (e.g., search advertisement) based on their annotations. The annotations of each content items are based on the entities found in the content items. The second content item may be relevant to the search query and to the first content item, but may have additional characteristics, such as licensing, permission, authorizations, etc. to be served along with the first content item to the user.

Figure 1:
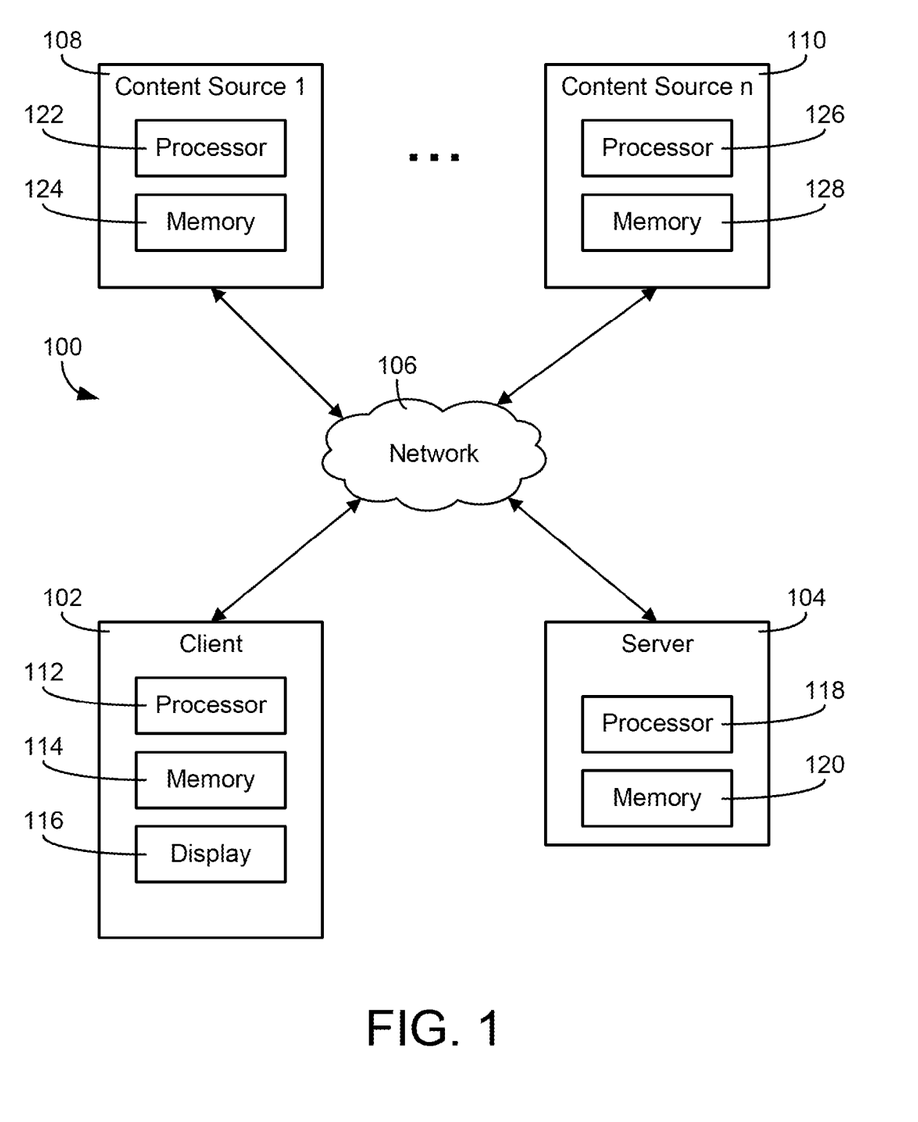
FIG. 1 is an example of a block diagram of an implementation of an environment for merging annotations of a first content item and a second content item in accordance with a described implementation.

FIG. 1 is a block diagram of a computer system 100 in accordance with a described implementation. System 100 includes client 102, which may communicate with other computing devices via a network 106. For example, client 102 may communicate with one or more content sources 108(*a*) to 108(*n*) (generally referred to as content sources 108. Content sources 108 may provide webpages and/or media content (e.g., audio, video, and other forms of digital content) to clients client 102. System 100 may include server 104, which provides advertisement data to other computing devices over network 106.

Network 106 may be any form of computer network that relays information between client 102, server 104, and content sources 108. For example, network 106 may include the Internet and/or other types of data networks, such as a local area network (LAN), a wide area network (WAN), a cellular network, satellite network, or other types of data networks. Network 106 may include any number of computing devices (e.g., computer, servers, routers, network switches, etc.) that are configured to receive and/or transmit data within network 106. Network 106 may include any number of hardwired and/or wireless connections. For example, client 102 may communicate wirelessly (e.g., via WiFi, cellular, radio, etc.) with a transceiver that is hardwired (e.g., via a fiber optic cable, a CAT5 cable, etc.) to other computing devices in network 106.

Network 106 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some implementations, different types of data may be transmitted via different links and standards. In other implementations, the same types of data may be transmitted via different links and standards.

Network 106 may be any type and/or form of network. The geographical scope of the network 106 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 106 may be an overlay network which is virtual and sits on top of one or more layers of other networks. The network 106 may be of any such network topology as known to those ordinarily skilled in the art capable of supporting the operations described herein. The network 106 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 106 may be a type of a broadcast network, a telecommunications network, a data communication network, or a computer network.

Client 102 may be any number of different user electronic devices configured to communicate via network 106 (e.g., a laptop computer, a desktop computer, a tablet computer, a smartphone, a digital video recorder, a set-top box for a television, a video game console, etc.). Client 102 is shown to include a processor 112 and a memory 114, i.e., a processing circuit. Memory 114 stores machine instructions that, when executed by processor 112, cause processor 112 to perform one or more of the operations described herein. Processor 112 may include a microprocessor, application-specific integrated circuit (ASIC), field-programmable gate array (FPGA), etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which processor 112 can read instructions. The instructions may include code from any suitable computer-programming language such as, but not limited to, C, C++, C#, Java, JavaScript, Perl, Python and Visual Basic.

Client 102 may include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). A wide variety of I/O devices may be present in the client device 102. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. The one or more user interface devices may be internal to a housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which visually displays webpages using webpage data received from content sources 108 and/or from server 104.

Device 102 may include a combination of multiple input or output devices. Device 102 may allow gesture recognition inputs through combining some of the inputs and outputs. Device 102 may provide for facial recognition which may be utilized as an input for different purposes including authentication and other commands. Device 102 may provide for voice recognition and inputs.

Device 102 may have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices or group of devices may be augment reality devices. The I/O devices may be controlled by an I/O controller. The I/O controller may control one or more I/O devices, such as, e.g., a keyboard and a pointing device, e.g., a mouse or optical pen. Furthermore, an I/O device may also provide storage and/or an installation medium for the device 102. In still other implementations, the device 102 may provide USB connections (not shown) to receive handheld USB storage devices. In further implementations, an I/O device may be a bridge between the system bus and an external communication bus, e.g. a USB bus, a SCSI bus, a FireWire bus, an Ethernet bus, a Gigabit Ethernet bus, a Fibre Channel bus, or a Thunderbolt bus.

In some implementations, display devices may be connected to I/O controller. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices may also be a head-mounted display (HMD). In some implementations, display devices or the corresponding I/O controllers may be controlled through or have hardware support for OPENGL or DIRECTX API or other graphics libraries.

In some implementations, the device 102 may include or connect to multiple display devices, which each may be of the same or different type and/or form. As such, any of the I/O devices and/or the I/O controller may include any type and/or form of suitable hardware, software, or combination of hardware and software to support, enable or provide for the connection and use of multiple display devices by the device 102. For example, device 102 may include any type and/or form of video adapter, video card, driver, and/or library to interface, communicate, connect or otherwise use the display devices. In one implementation, a video adapter may include multiple connectors to interface to multiple display devices. In other implementations, the device 102 may include multiple video adapters, with each video adapter connected to one or more of the display devices. In some implementations, any portion of the operating system of the device 102 may be configured for using multiple displays. In other implementations, one or more of the display devices may be provided by one or more other client devices connected to the client device 102, via the network 106. In some implementations software may be designed and constructed to use another computer's display device as a second display device for the device 102.

Client device 102 may comprise a storage device (e.g. one or more hard disk drives or redundant arrays of independent disks) for storing an operating system or other related software, and for storing application software programs such as any program related to the software for the experiment tracker system. Examples of storage device include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device may be non-volatile, mutable, or read-only. Some storage device may be internal and connect to the client device 102 via a bus. Some storage device may be external and connect to the client device 102 via a I/O device that provides an external bus. Some storage device may connect to the device 102 via the network interface over a network 106. Some client devices 102 may not require a non-volatile storage device and may be thin clients or zero clients 102. Some storage device may also be used as a installation device, and may be suitable for installing software and programs. Additionally, the operating system and the software can be run from a bootable medium, for example, on a bootable CD.

Device 102 may also install software or application from an application distribution platform. An application distribution platform may facilitate installation of software on a client device 102. An application distribution platform may include a repository of applications on a server 104 or a cloud, which the client 102 may access over a network 106. An application distribution platform may include application developed and provided by various developers. A user of a client device 102 may select, purchase and/or download an application via the application distribution platform.

Furthermore, the device 102 may include a network interface to interface to the network 106 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one implementation, the computing device 100 communicates with other computing devices 100' via any type and/or form of gateway or tunneling protocol e.g. Secure Socket Layer (SSL) or Transport Layer Security (TLS), etc. The network interface may comprise a built-in network adapter, network interface card, PCMCIA network card, EXPRESSCARD network card, card bus network adapter, wireless network adapter, USB network adapter, modem or any other device suitable for interfacing the client device 102 to any type of network capable of communication and performing the operations described herein.

Device 102 may operate under the control of an operating system, which controls scheduling of tasks and access to system resources. Device 102 can be running any operating system such as any embedded operating system, any real-time operating system, any open source operating system, any proprietary operating system, any operating systems for mobile computing devices, or any other operating system capable of running on the computing device and performing the operations described herein.

Device 102 may be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some implementations, client 102 may have different processors, operating systems, and input devices consistent with the device.

Device 102 may include a gaming system. In some implementations, device 102 is a digital audio player. Some digital audio players may have other functionality, including, e.g., a gaming system or any functionality made available by an application from a digital application distribution platform. In some implementations, client device 102 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats. In some implementations, device 102 is a tablet. In some implementations, device 102 includes a combination of devices, e.g. a smartphone combined with a digital audio player or portable media player. In yet another implementation, device 102 is a laptop or desktop computer equipped with a web browser and a microphone and speaker system, e.g. a telephony headset. In these implementations, the device 102 is web-enabled and can receive and initiate phone calls. In some implementations, a laptop or desktop computer is also equipped with a webcam or other video capture device that enables video chat and video call.

Content sources 108 are electronic devices connected to network 106 and provide media content to client 102. For example, content sources 108 may be computer servers (e.g., FTP servers, file sharing servers, web servers, etc.) or other devices that include a processing circuit. Media content may include, but is not limited to, webpage data, a movie, a sound file, pictures, and other forms of data. Similarly, server 104 may include a processing circuit including a processor 120 and a memory 122. In some implementations, server 104 may include several computing devices (e.g., a data center, a network of servers, etc.). In such a case, the various devices of server 104 may comprise a processing circuit (e.g., processor 120 represents the collective processors of the devices and memory 122 represents the collective memories of the devices).

Similarly, server 104 may include a processing circuit including a processor 120 and a memory 122. In some implementations, server 104 may include several computing devices (e.g., a data center, a network of servers, etc.). In such a case, the various devices of server 104 may comprise a processing circuit (e.g., processor 120 represents the collective processors of the devices and memory 122 represents the collective memories of the devices).

Server 104 may be one or more computing devices on network 106 that facilitate the searching of content sources 108 for media content. In some implementations, server 104 may provide one or more interfaces (e.g., displayed webpages, etc.) to an interface device of client 102. For example, client 102 may store a web browser that can receive web pages from server 104. The webpage may be rendered, for example, by the browser executing on client device 102. When the webpage is rendered, the content is displayed, which may include graphics, text, audio, etc.

In some implementations, the system may include multiple, logically-grouped servers 104. In one of these implementations, the logical group of servers may be referred to as a server farm or a machine farm. In another of these implementations, the servers 104 may be geographically dispersed. In other implementations, a machine farm may be administered as a single entity. In still other implementations, the machine farm includes a plurality of machine farms. The servers 104 within each machine farm can be heterogeneous—one or more of the servers 104 or machines 104 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one implementation, servers 104 in the machine farm may be stored in high-density rack systems, along with associated storage systems, and located in an enterprise data center. In this implementation, consolidating the servers 104 in this way may improve system manageability, data security, the physical security of the system, and system performance by locating servers 104 and high performance storage systems on localized high performance networks. Centralizing the servers 104 and storage systems and coupling them with advanced system management tools allows more efficient use of server resources.

The servers 104 of each machine farm do not need to be physically proximate to another server 104 in the same machine farm. Thus, the group of servers 104 logically grouped as a machine farm may be interconnected using a wide-area network (WAN) connection or a metropolitan-area network (MAN) connection. For example, a machine farm may include servers 104 physically located in different continents or different regions of a continent, country, state, city, campus, or room. Data transmission speeds between servers 104 in the machine farm can be increased if the servers 104 are connected using a local-area network (LAN) connection or some form of direct connection. Additionally, a heterogeneous machine farm may include one or more servers 104 operating according to a type of operating system, while one or more other servers 104 execute one or more types of hypervisors rather than operating systems. In these implementations, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm may be de-centralized. For example, one or more servers 104 may comprise components, subsystems and modules to support one or more management services for the machine farm. In one of these implementations, one or more servers 104 provide functionality for management of dynamic data, including techniques for handling failover, data replication, and increasing the robustness of the machine farm. Each server 104 may communicate with a persistent store and, in some implementations, with a dynamic store.

Server 104 may be a file server, application server, web server, proxy server, appliance, network appliance, gateway, gateway server, virtualization server, deployment server, SSL VPN server, or firewall. In one implementation, the server 104 may be referred to as a remote machine or a node. In another implementation, a plurality of nodes may be in the path between any two communicating servers.

The client 102 and server 104 may be deployed as and/or executed on any type and form of computing device, e.g. a computer, network device or appliance capable of communicating on any type and form of network and performing the operations described herein.

In other implementations, the search interfaces may be local to client 102 (e.g., an application, program, script, etc., that is running on client 102) and updated using information from server 104 (e.g., by making API calls, SQL queries, etc.). For example, client 102 may store a media player or other application in memory 114 that allows a user to access media content, when executed. The media player application may also include the ability to send search queries to server 104 for media content availability.

Server 104 may provide content items, such as digital advertisements, to client 102 via network 106. For example, content source 108 may provide a webpage to client 102, in response to receiving a request for a webpage from client 102. In some implementations, an advertisement from server 104 may be provided to client 102 indirectly. For example, content source 108 may receive advertisement data from server 104 and use the advertisement as part of the webpage data provided to client 102. In other implementations, an advertisement from server 104 may be provided to client 102 directly. For example, content source 108 may provide webpage data to clients client 102 that includes a command to retrieve an advertisement from server 104. On receipt of the webpage data, client 102 may retrieve an advertisement from server 104 based on the command and display the advertisement when the webpage is rendered on display 116.

According to various implementations, a user of client 102 may search for, access, etc. various documents (e.g., web pages, web sites, articles, images, video, etc.) using a search engine via network 106. The documents may be displayed as a search result from a search engine query containing search terms or keywords. Search engine queries may allow the user to enter a search term or keyword into the search engine to execute a document search. Search engines may be stored in memory 122 of server 104 and may be accessible with client 102. The result of an executed website search on a search engine may include a display on a search engine document of links to websites. Executed search engine queries may result in the display of advertising data generated and transmitted from server 104. In some cases, search engines contract with advertisers to display advertising to users of the search engine in response to certain search engine queries.

In some implementations, the device identifier is associated with a particular instance of a client application (e.g., running on client device 102). In some implementations, the device identifier is associated with a user (e.g., when the user logs in with a username and password). Some information that may be associated with the user may include events, such as one or more queries, one or more clicks, browser history data (e.g., the URLs visited, the number of URLs viewed, URL visit durations, etc.), etc. Events may also include advertising metrics, such as impressions, click through rate, etc. for each user. For example, the device identifier may include a time stamp associated with a particular event. Events may also include how many times a user is exposed to a particular ad, a campaign, etc.

Content source may select content to be provided with a webpage based on the device identifier for a user visiting the document.

For example, a user may select to receive a content items from a server. Rather than selecting an content to be provided on the web page based on the content of the web page itself or on other factors, server 104 may take into account the device identifier provided as part of the content request. In one example, a user may visit a number of webpages devoted to reviews of golf clubs and later visit a webpage to check stock quotes. Based on the user's visits to the golf-related webpages, the user may be determined to be interested in receiving contents for golf clubs. When the user later visits the webpage to check stock quotes, an online retailer of golf equipment may seek to include an content on the webpage for that particular user, even though the financial webpage is unrelated to golf.

If content is selected based in part on a device identifier for a user that selects to receive more a content item, a content provider may specify that certain content is to be provided to a set of device identifiers. For example, an content provider may identify a set of device identifiers associated with visiting the content provider's website and making a purchase. Such users may later wish to know if the content provider is running a sale. In some cases, an advertising network may identify users on behalf of the content provider that may be interested in receiving contents from the content provider. For example, content providers may specify a number of topic categories for their contents and the advertising network may match users' interests to the categories, to provide a content items to the users.

Figure 2:
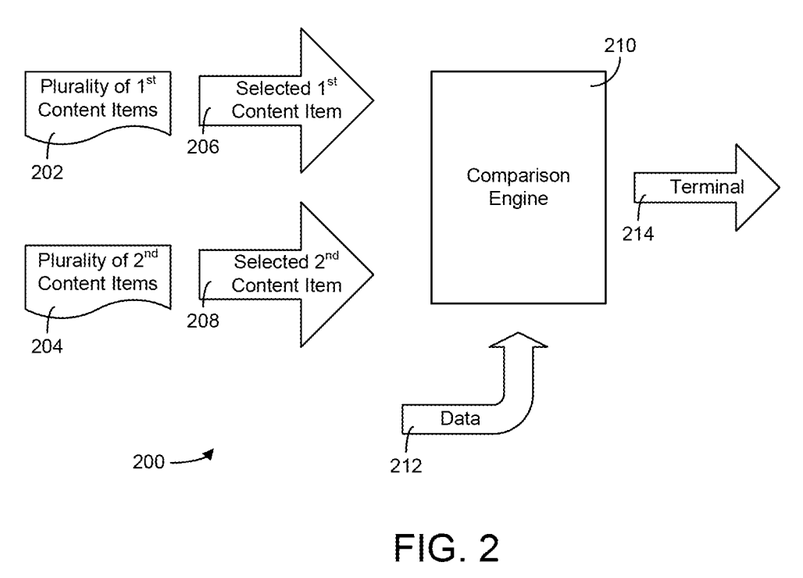
FIG. 2 is an illustration of an example system for providing content for display, in accordance with a described implementation.

FIG. 2 is an illustration of an example system 200 for providing content for display in accordance with a described implementation.

In a brief overview, system 200 includes a plurality of first content items 202, a plurality of second content items 204, a selected first content item 206, a selected second content item 208, comparison engine 210, data 212 and terminal 214. In some implementations, system 200 may include more or less components.

Figure 3:
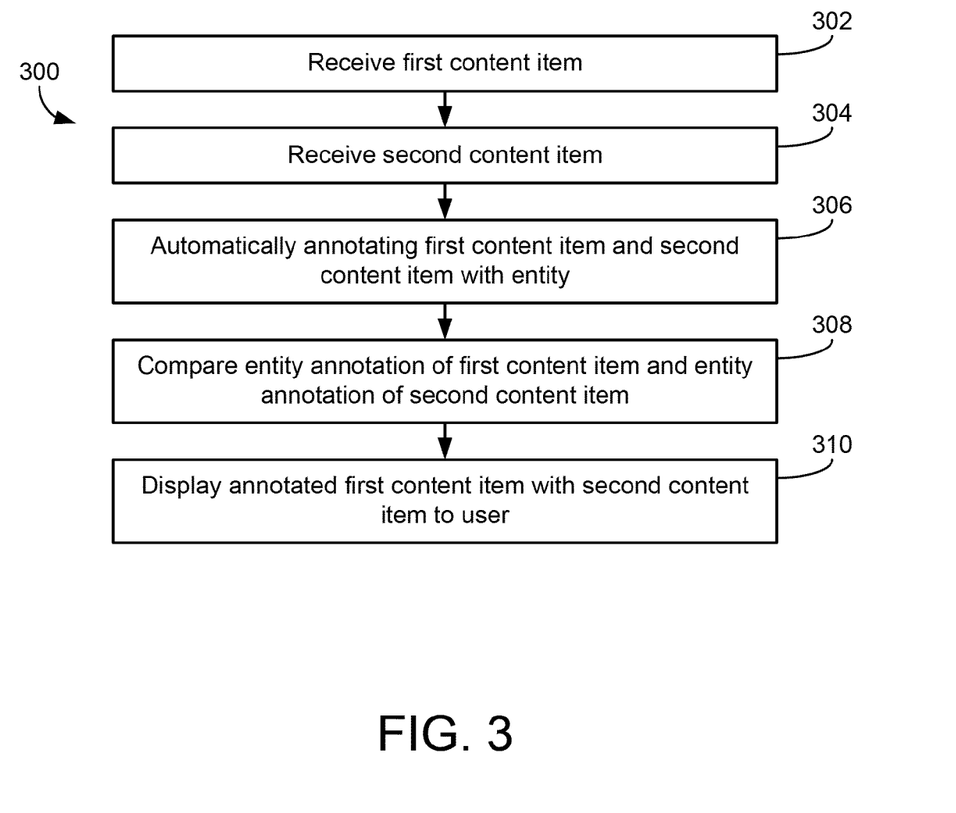
FIG. 3 is an example of a display provided to a user, in accordance with a described implementation.
Figure 4:
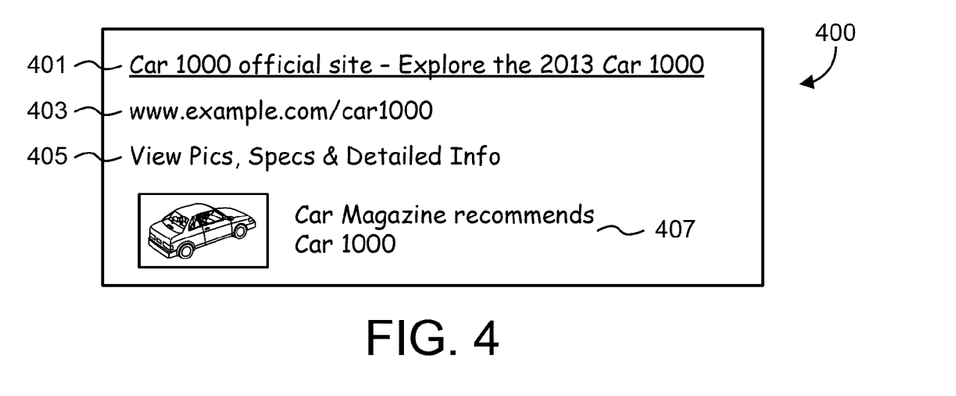
FIG. 4 is an example of a display provided to a user, in accordance with a described implementation.
Figure 5:
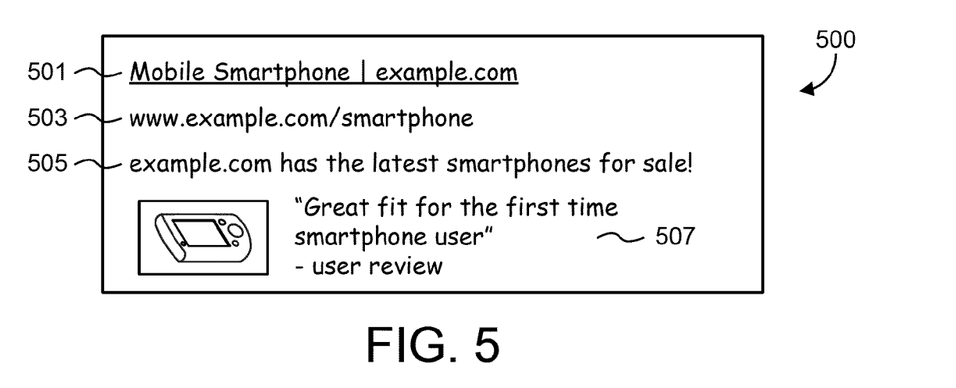
FIG. 5 is an example of a display provided to a user, in accordance with a described implementation.
Figure 6:
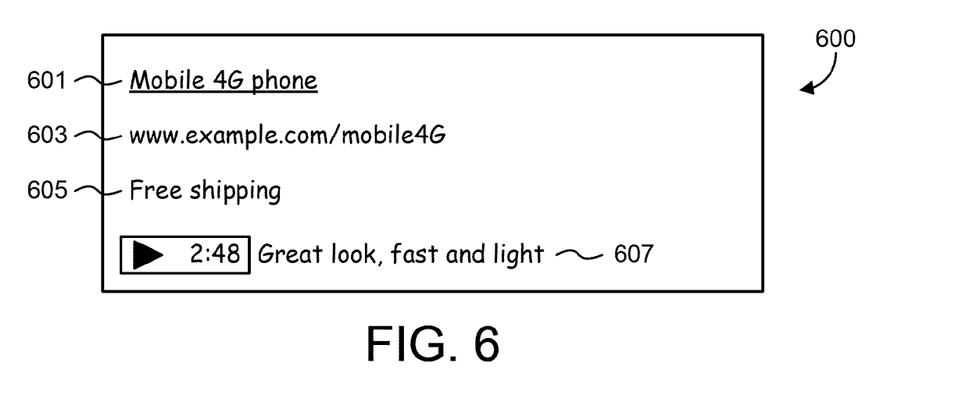
FIG. 6 is an example of a display provided to a user, in accordance with a described implementation.
Figure 7:
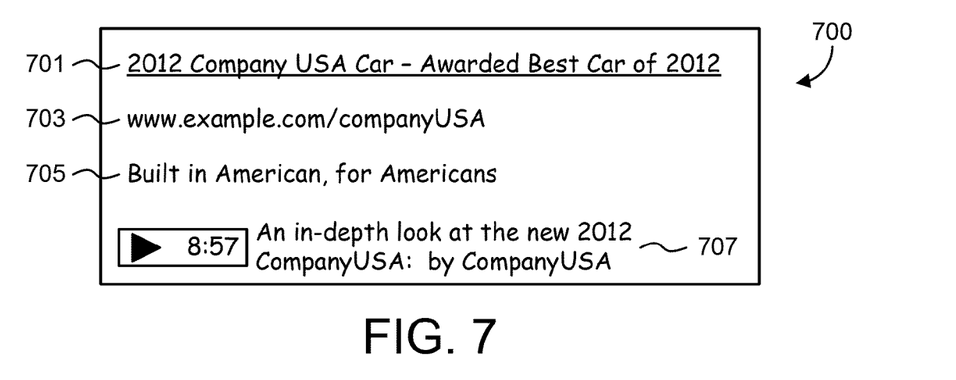
FIG. 7 is an example of a display provided to a user, in accordance with a described implementation.
Figure 8:
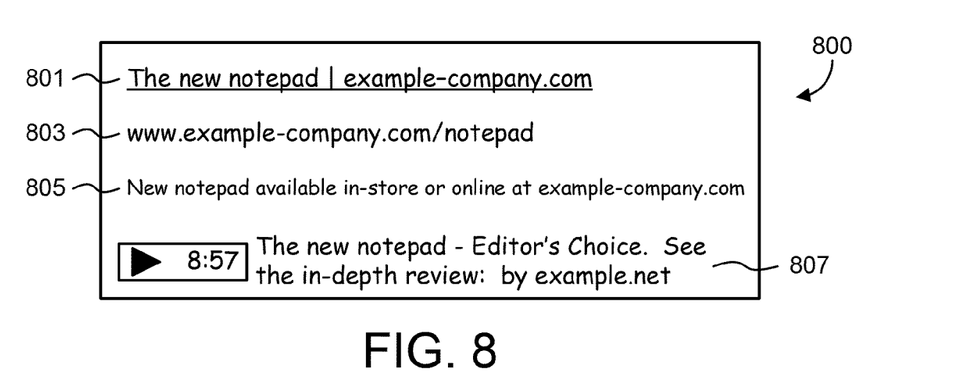
FIG. 8 is a flow diagram of a method for providing content for display, in accordance with a described implementation.

System 200 may be used for the operations described in association with process 300 described in FIG. 3, according to one implementation. For example, one or more of system 200 may be used to implement process 300.

System 200 may include the plurality of first content items 202. The plurality of first content items 202 may be stored in a database. The database storing the plurality of first content items may be managed via campaign assistance operations, which may be employed to help advertisers generate effective campaigns. For example, the campaign assistance operations may use information provided by system 100 for use with a search engine and may monitor all possible impression data for the first content items, keywords, etc.

System 200 may also include the plurality of second content items 204. The plurality of second content items 204 may be stored in a number of repositories. The repository storing the plurality of second content items may be indexed by user information, tags, etc. For example, the user information, tags, etc. may be featured on the plurality of second content items so that only a subset of the second content items are retrieved for particular types of users.

A first content item and a second content item 206, 208 are selected from the plurality of first and second content items 202, 204 by system 100, such as by server 104. The first content item 206 may be selected by the system due to its relationship to a search query performed by a user.

The annotation of first content item 206 and second content item 208 may be an automatic process. For example, a supplier that provides annotations and/or facilitates the inclusion of annotations of the entities within the content items may automatically annotate the content items with entities. In some implementations, the advertiser may select which content items are appropriate for annotations with entities and the selection engine automatically annotates those content items. Content items 206, 208 are annotated to build a map between the content items to the entities.

System 200 may also include comparison engine 210. Comparison engine 210 receives selected first content item 206 and selected second content item 208. Comparison engine 210 may include a processing circuit that may receive machine executable instructions. In some implementations, comparison engine 210 may be a server computer.

Comparison engine 210 receives entities associated with each content item 206, 208 to determine whether second content item 208 should be selected for display at terminal 214 with first content item 206. If comparison engine 210 determines that the entities of the first content item and the second content item match, then comparison engine 210 may provide this determination to system 100, which may facilitate distribution of the first content item and the second content item to terminal 214.

In some implementations, terminal 214 may include a personal computer (e.g., desktop computers), a mobile computing device, cell phone, smart phone, media players/recorders, music player, game console, media center, media player, electronic tablet, personal digital assistant (PDA), television system, audio system, radio system, removable storage device, navigation system, set top box, and other electronic devices. Terminal 214 may be a public kiosk.

Terminal 214 may be operable to retrieve and display content, such as content provided by the advertiser or a publisher. In some implementations, terminal 214 may communicate with the advertiser through a network using a browser application. The advertiser may provide content, such as webpages, advertisements, etc. that provide instructions usable by the browser by terminal 214 to display the content associated with a web page.

When terminal 214 receives content items 206, 208, system 100 may determine how to render content items 206, 208 for display to the user. In some implementations, content items 206, 208 may include text, graphics, audio, video, etc. In another implementation, content items 206, 208 may include multiple components. For example, content item 206 may include text, while content item 208 may include audio, which are then provided to the user via terminal 214.

Terminal 214 may provide usage information to system 100, such as whether a conversion took place or a click-through related to the content items 206, 208 occurred. This usage information may be provided to publishers, advertiser, etc. Terminal 214 may also provide content related information to system 100, such as information about the content, location information, categories of the content, etc.

FIG. 3 is an example of a flow diagram of a method 300 of providing content for display. Example method 300 may be implemented by various combinations of systems. Example 300 may be performed online or offline.

Example method 300 may begin at block 302, where a first content item is received at a server. In some implementations, the plurality of first content items are advertisements. The advertisements may be stored, maintained, modified, etc. by an advertiser. The plurality of first content items may include a combination of text, landing page, a keyword for which the first content items are selected, etc.

The first content item may be selected from a plurality of first content items. The plurality of first content items may be submitted by a content provider, such as an advertiser. A first content item may be selected from the plurality of first content items based on a budget, a bid, or other monetary amount submitted by a content provider. The first content item may include a text file, a URL, or a keyword for which the first content item is selected. For example, a search query may include a keyword that is related to the first content item.

At block 304, a second content item may be received at the server. The second content item may be selected from a plurality of second content items.

The plurality of second content items may be content provided by a publisher, an advertiser, a third party, another user, etc. For example, the plurality of second content items may include video content. In another example, the plurality of second content items may include an image, a song, a graph, an animation, etc. The second content item may include a title, a description, and user interaction data. The user interaction data may include a review, a comment, a share, or other appropriate interactions. For example, the interaction may include social networking activity, such as posts, messages, etc. For example, the second content item may be a video of Singer A singing Song B, which may include User K's review. The second content item may be selected from the plurality of second content items based on relevance, quality, etc.

At block 306, the first content item and the second content item are automatically annotated with an entity. The selected first content item 206 and the selected second content item 208 may include an annotation of the entity. An entity may be defined as a single thing or concept that is present in the world, such as a person, place, or thing, while the annotations may include images, audio, video, etc. The annotation may be an image of Person A, while the entity is Person A.

Entities may be stored in a database or knowledgebase. Examples of entity databases may include, but are not limited to, Freebase and the Google Knowledge Graph. Annotation of entities may be performed by mapping phrases in the content items to defined entities using known methods of topic and context analysis and disambiguation (e.g., scoring and ranking the relevancy of a phrase to a particular entity based on the relevancy of the phrase to topics or contextual information in a particular content item).

In some implementations, the annotation of the entity may include social annotations, which may be based on actions of all users, an individual or a certain individual, e.g., "321 people follow Brand K on Social Friend Network" or "KJ high-fived this advertiser!"

For example, a website, such as Company A, may include advertisements for Product D. An entity associated with D may have a proper name and a relationship related to the entity (or meta-entities). A determination is made for which metaentity, entity, etc. best describes the category that contains the entity associated with Product D. For example, Product D is a digital camera, single-lens reflex (SLR), and a midlevel digital SLR, i.e., these are meta-entities for Product D. Each of these meta-entities describes a class of things that are members of that class. For example, the class of all digital cameras, includes those meta-entities. Then, a determination is made for each of the second content item that mentions one of the entities for first content item. For example, whether a social networking post mentions Product D.

Factors for automatically annotating the first content item and the second content item with an entity may include, but are not limited to, the number of messages within a group of users, the number of members of the group of users, the number of products mentioned, etc.

At block 308, the entity annotation of the first content item and the entity annotation of the second content item are compared. Comparison engine 210 receives data 212, which may include the authorization, license, permissions, restrictions, etc. related to the selected second content item 208. A determination may be made whether there is a match between the entities. For example, the first content item may be an advertisement for Automobile B; Automobile B being the entity. The second content item may be a video by Magazine C discussing the perks of Automobile B, also including Automobile B as an entity. Therefore, the entities match of the advertisement and the video for Automobile B.

Comparison engine 210 evaluates selected first content item, selected second content item, and data 212 to determine whether to provide the selected first content item along with the second content item for display.

In some implementations, the content owner, advertiser, etc. may select a price that they are willing to pay to have the second content item served with first content item. The price may be in the form of a bid. For example, the bid may be received and the first content item and the second content item are annotated with entities and the annotation information is stored in a repository for bids.

At block 310, the annotated first content item is displayed with the second content item to the user. The second content item may be integrated into the first content item, such as an embedded URL, video, audio, or multimedia content. In some implementations, the second content item may be displayed along with the first content item if it is authorized. For example, the advertiser may only want the second content item that is displayed to be a content item owned by the advertiser or licensed by the advertiser.

In some implementations, a determination is made as to whether annotated characteristics apply to the annotated second content item. The characteristics may include licensing, authorization, permission, etc. that apply to the second content item. The restrictions may also include a subjective analysis of the second content item.

The annotated second content item may belong to the content owner, advertiser, publisher, etc. For example, the content owner may determine that the second content item only be displayed if it originates from approved video sources, such as the product's company rather than any user. In another example, the annotated second content item may be authorized for use by other content owners, advertisers, publishers, etc., i.e., the annotated second content item may licensed for use for these content owners, advertiser, publishers, etc. For example, the annotated second content item may be a video clip that is owned by a movie company highlighting an automobile. The automobile company may want to use the video clip in an advertisement. The movie company may authorize or license use of the video clip to the automobile company. In another example, the content owner may specify characteristic terms (e.g., licensing) based on cost per impression, cost per video, cost per click, and so forth.

In some implementations, an analysis of a sentiment score may be performed to determine the sentiment toward the product, topic, etc. to determine whether to provide the annotated first content item along with the second content item for display. For example, if the social network messages are negative about the product, then the content owner does not want to display the second content item along with the first content item. The sentiment analysis may include a user, a specific group of users, etc. Selecting the user may be based on the relevance of the user's content to the query, to the product, to the content owner, etc. In some implementations, the selection of the user may be selected by the content owner or by the search engine provider.

FIGS. 4-8 are examples 400, 500, 600, 700, 800 of a display via terminal 214 to a user. Examples 400, 500, 600, 700 and 800 are content items that may be displayed in response to a search query by a user.

Each example 400, 500, 600, 700, 800 of a display of a first content item and a second content item includes sections 401, 501, 601, 701, and 801, sections 403, 503, 603, 703, and 803, sections 405, 505, 605, 705, and 805, and sections 407, 507, 607, 707, and 807. Examples 400, 500, 600, 700, and 800 may include more sections or fewer sections.

Sections 401, 501, 601, 701, and 801 may include a title, name, location, etc. of the product related to the first content item. For example, section 401 includes the landing page of the product. Section 501 includes the title of the product as well as the product's website. Section 601 includes the name of the product. Section 701 includes the name of the product along with congratulatory text. Section 801 includes the name of the product along with another company's website where the product can be found.

Sections 403, 503, 603, 703, and 803 may include the URL, hyperlink, etc. of the web page where the product related to the first content item may be located. Sections 403, 503, 603, and 703 are the product's actual website. Section 803 is an example of a company's website that carries the product.

Sections 405, 505, 605, 705, and 805 may include text related to the first content item. The text may direct the user to additional content (405), a website (505), promotions (605), descriptions (705), or availability (805).

Sections 407, 507, 607, 707, and 807 include the second content item. The second content item may include a recommendation 407, 507, a video 607, 707, 807, audio, images, etc.

Implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is tangible.

The operations described in this specification can be performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of providing content for display, comprising:
receiving, at one or more of a plurality of servers, a first plurality of content items including a first content item, and a second plurality of content items including a second content item, the second content item comprising a review, a comment, or a social-network share;
annotating, by any of the plurality of servers, the first content item with one or more entity annotations descriptive of one or more entities of the first content item based on a mapping of phrases in the first content item to pre-defined entities, wherein each of the one or more entities of the first content item is a respective place or respective thing represented in the first content item;
selecting the first content item from the first plurality of content items for display at a client device;
annotating, by any of the plurality of servers, the second content item with one or more entity annotations descriptive of entities of the second content item;
comparing the one or more entity annotations of the selected first content item to the respective one or more entity annotations of two or more of the second plurality of content items including the one or more entity annotations of the second content item;
selecting, based on the comparison, the second content item based on the one or more entity annotations of the second content item matching the entity annotation of the first content item;
generating a content section comprising the first content item along with the second content item; and
providing, based on the selection of the second content item, the content section to the client device for aggregate display of the first content item and the second content item.

2. The method of claim 1, wherein the first content item is an advertisement subject to a presentation restriction, the method further comprising:
determining whether the presentation restriction is compatible with presentation of the second content item.

3. The method of claim 2, wherein the second content item comprises content related to the advertisement.

4. The method of claim 3, wherein the second content item comprises video, audio or multimedia content.

5. The method of claim 1, wherein the second content item comprises user interaction data.

6. The method of claim 5, wherein the user interaction data comprises social networking activity.

7. The method of claim 1, wherein the second content item is authorized by an advertiser.

8. The method of claim 1, wherein the second content item is related to a search query.

9. The method of claim 1, wherein the first content item and the second content item are selected to be provided to the client device for display in response to a search query received from the client device.

10. The method of claim 1, comprising:
annotating the first content item further based on a relevancy of the phrases in the first content item to a particular entity.

11. The method of claim 1, comprising:
annotating the second content item based on a mapping of phrases in the second content item to pre-defined entities.

12. A system for providing content for display, the system comprising one or more processing circuit operable to:
receive a first plurality of content items including a first content item;
receive a second plurality of content items including a second content item comprising at least one of a review, a comment, and a social-network share;
annotate the first content item with one or more entity annotations descriptive of one or more entities of the first content item based on a mapping of phrases in the first content item to pre-defined entities, wherein each of the one or more entities of the first content item is a respective place or respective thing represented in the first content item;
select the first content item from the first plurality of content items for display at a client device;
annotate the second content item with one or more entity annotations descriptive of entities of the second content item;
compare the one or more entity annotations of the first content item to the respective one or more entity annotations of two or more of the second plurality of content items including the one or more entity annotations of the second content item;
select, based on the comparison, the second content item based on the one or more entity annotations of the second content item matching the entity annotation of the first content item;
generate a content section comprising the first content item along with the second content item; and
provide the content section to the client device for aggregate display of the first content item and the second content item.

13. The system of claim 12, wherein the first content item is an advertisement subject to a presentation restriction, and the processing circuit is further operable to:
determine whether the presentation restriction is compatible with presentation of the second content item.

14. The system of claim 12, wherein the second content item comprises content related to the advertisement.

15. The system of claim 12, wherein the second content item comprises video, audio or multimedia content.

16. The system of claim 12, wherein the first content item comprises a text file, a URL, or a keyword for which the first content item is selected.

17. The system of claim 12, wherein the second content item comprises user interaction data.

18. The system of claim 17, wherein the user interaction data comprises social networking activity.

19. A non-transitory computer-readable storage medium having instructions therein, the instructions being executable by a processor to cause the processor to perform operations comprising:
receiving a first plurality of content items including a first content item, and a second plurality of content items including a second content item comprising a review, a comment, or a social-network share;
annotating the first content item with one or more entity annotations descriptive of one or more entities of the first content item based on a mapping of phrases in the first content item to pre-defined entities, wherein each of the one or more entities of the first content item is a respective place or respective thing represented in the first content item;
selecting the first content item from the first plurality of content items for display at a client device;
annotating the second content item with one or more entity annotations descriptive of entities of the second content item;
comparing the one or more entity annotations of the selected first content item to the respective one or more entity annotations of two or more of the second plurality of content items including the one or more entity annotations of the second content item;
selecting, based on the comparison, the second content item based on the one or more entity annotations of the second content item matching the entity annotation of the first content item; and
generating a content section comprising the first content item along with the second content item; and
providing, based on the selection of the second content item, the content section to the client device for aggregate display of the first content item and the second content item.

* * * * *